United States Patent
Lu et al.

(10) Patent No.: US 7,529,804 B1
(45) Date of Patent: May 5, 2009

(54) SYSTEM AND METHOD FOR COMPREHENSIVE AUTOMATIC COLOR CUSTOMIZATION IN AN EMAIL MESSAGE BASED ON CULTURAL PERSPECTIVE

(75) Inventors: Fang Lu, Billerica, MA (US); Susan Marie Cox, Rochester, MN (US); Janani Janakiraman, Austin, TX (US); Loulwa Salem, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/121,285

(22) Filed: May 15, 2008

(51) Int. Cl.
*G06F 15/16* (2006.01)
(52) U.S. Cl. ........................ 709/206; 709/207
(58) Field of Classification Search .............. 709/204, 709/206, 207
See application file for complete search history.

(56) References Cited

U.S. PATENT DOCUMENTS

| | | | |
|---|---|---|---|
| 5,835,768 A | 11/1998 | Miller et al. | |
| 6,111,572 A | 8/2000 | Blair et al. | |
| 6,529,942 B1 | 3/2003 | Gilbert | |
| 6,581,109 B1 | 6/2003 | Fields et al. | |
| 6,661,348 B2 | 12/2003 | Hall et al. | |
| 6,697,824 B1 | 2/2004 | Bowman-Amuah | |
| 6,795,084 B2 | 9/2004 | Newman | |
| 6,819,338 B2 | 11/2004 | Heasman et al. | |
| 7,030,845 B2 | 4/2006 | Maa | |
| 7,099,040 B1 | 8/2006 | Cooper et al. | |
| 7,137,070 B2 | 11/2006 | Brown et al. | |
| 7,149,964 B1 | 12/2006 | Cottille et al. | |
| 7,152,093 B2 | 12/2006 | Ludwig et al. | |
| 7,392,289 B2 | 6/2008 | Curry et al. | |
| 2002/0120600 A1 | 8/2002 | Schiavone et al. | |
| 2002/0194341 A1 | 12/2002 | Gupta | |
| 2003/0115271 A1 | 6/2003 | Weissman | |
| 2004/0001090 A1 | 1/2004 | Brown et al. | |
| 2006/0168057 A1 | 7/2006 | Warren et al. | |
| 2007/0044011 A1 | 2/2007 | Cottrille et al. | |
| 2007/0174398 A1 | 7/2007 | Addante | |
| 2008/0059874 A1 | 3/2008 | Spencer | |
| 2008/0086695 A1 | 4/2008 | Oral | |

FOREIGN PATENT DOCUMENTS

JP 2004145418 5/2004

*Primary Examiner*—Jeffrey Pwu
*Assistant Examiner*—David Ampagoomian
(74) *Attorney, Agent, or Firm*—Keusey, Tutunjian & Bitetto, P.C.

(57) ABSTRACT

A method for customizing color in an email message based on cultural perspective of each recipient is provided. At least one existing color used in an email message is determined, and a domain name and/or information for each recipient of the email message is analyzed to determine a region corresponding to each recipient. A color mapping database is searched to correlate any existing color in the email to at least one approved color corresponding to each region. The existing color used in the email message is compared with the at least one approved color for each recipient. If the existing color does not match any of the approved colors for each recipient, a sender-selected approved color is determined and the existing color in the email is converted to at least one of the selected approved colors for each recipient of the email message.

1 Claim, 4 Drawing Sheets

SYSTEM AND METHOD FOR COMPREHENSIVE AUTOMATIC COLOR CUSTOMIZATION IN AN EMAIL MESSAGE BASED ON CULTURAL PERSPECTIVE

BACKGROUND

1. Technical Field

The present invention relates to color customization in electronic mail, and more particularly, to systems and methods for customizing colors used in Email messages based on cultural perspective and geographic location of the recipient.

2. Description of the Related Art

Color often implies very different meanings in different cultures of human society. For example, the color red symbolizes good luck in the Chinese culture. In the American culture, among others, the color red is used as a warning and to signal danger or an emergency. In the Korean culture, text written in red is traditionally was used to convey an insulting message. Especially, names written in red symbolizes death.

Furthermore, emergency exits are marked with green signs in many Asian countries since in Asian cultures the color green symbolizes life, whereas in the United States an emergency exit is marked with signs having the color red to indicate an emergency situation. In other examples, in the Western cultures the color white is associated with purity and wedding ceremonies, whereas in the East (i.e., in many Asian societies), the color white is used and associated with death and funeral/burial ceremonies.

Color is often used in email messages for emphasis, highlighting effects in text, designs, drawings, images, etc. Color itself often provides a context for the message being sent and received, often imparting different connotations and meanings to any additional data in the message.

With the Internet, email is often exchanged between individuals in different countries and regions throughout the world. However, email does not provide the elements of a face-to-face communication, and thus there is a greater chance for misunderstandings in communication. Indeed, communication problems can arise from the interchange of messages between people of diverse cultures.

For example, the difference in meanings of various colors based on different cultural points of view can sometimes disrupt, impede or cause misinterpretation in communications (e.g., in written email communications), between people of different cultures, and thus cause miscommunication and misunderstandings at a "meta-message" level, as individuals from different cultures often have a disparate, sometimes wholly opposite understanding of what even a single particular color implies or represents.

It is difficult and unlikely for all or most individuals to be aware of and keep track of appropriate colors for use in messages sent to all other areas of the world. Even if one was adept and knowledgeable as to all the acceptable and appropriate colors to be used in email communication based on customs and perspectives in other cultures, it is inconvenient to manually adjust every email message sent to every recipient so as to avoid sending emails which might cause any misunderstandings based on inappropriate color use. Indeed, to be expected to do so would defeat the purpose of email as being an efficient and expedient mode of communication.

Accordingly, a system and method for improving email communication sent and received across different cultures is highly desirable.

SUMMARY

In the present embodiments, systems and methods are provided which improve and clarify email communications across different regions and cultures via automatic determination, translation and conversion of color in email messages in an efficient and effective manner.

According to one aspect, a system and method for customizing color in an email message based on cultural perspective of each email recipient is provided comprising the steps of determining at least one existing color used in an email message, analyzing at least one of a domain name or profile information for each recipient of the email message to determine a region corresponding to each email recipient, and searching a color mapping database to correlate the at least one existing color in the email to at least one approved color corresponding to each region of each email recipient, wherein said at least one approved color conveys a consistent meaning with a meaning of the at least one existing color in the email. The at least one existing color used in the email message is compared with the at least one approved color for each email recipient, wherein if the at least one existing color does not match any of its corresponding approved colors for each email recipient further comprising the steps of determining a selected approved color to be displayed to each email recipient, and automatically modifying the at least one existing color in the email to at least one of the selected approved colors for each recipient of the email message.

These and other features and advantages will become apparent from the following detailed description of illustrative embodiments thereof, which is to be read in connection with the accompanying drawings.

BRIEF DESCRIPTION OF THE DRAWINGS

The disclosure will provide details in the following description of preferred embodiments with reference to the following figures wherein.

DETAILED DESCRIPTION OF PREFERRED EMBODIMENTS

The present invention provides systems and methods which help reduce misunderstandings in communication across different cultures due to color usage in emails, and provides ease and efficiency in improving communication between email senders/recipients in different cultures and regions of the world.

According to one embodiment, a system and method is provided wherein a "sender system" (e.g., the computer used to compose/send an email message) is configured to personalize, translate and customize any colors in an email based on the email recipient's domain name information. That is, before the email is sent out by the sender, the domain name of the recipients) email addresses is analyzed. Once the domain name is parsed out from the email address, the font color used in the email itself is determined (e.g., via an applied computer algorithm). A search is conducted at a local database built within the email sender's email application to determine the appropriateness of the email's existing color selection. If any rules stating appropriate color use in certain regions are found, and if it is further determined that the existing colors used in the email do not follow the rules for appropriate color use, then the color(s) used in the email are automatically and dynamically replaced ('translated') by the program as needed. For example, existing text may be changed from red to green to maintain a consistent meaning across different countries, Thus, in this example, before the email is sent to a recipient, it is already modified with the appropriate (i.e. "approved" or "translated") color(s) (e.g., font color).

In alternate embodiments, discussed further below, a server may be equipped to customize the color or emails which are transmitted/received. Thus, color conversion according to the present principles can be done either at the sender/server. However, the color customization/conversion process is preferably performed at only one site for each given email to avoid the problem of converting it at multiple places and losing its correct original meaning.

Figure 1:
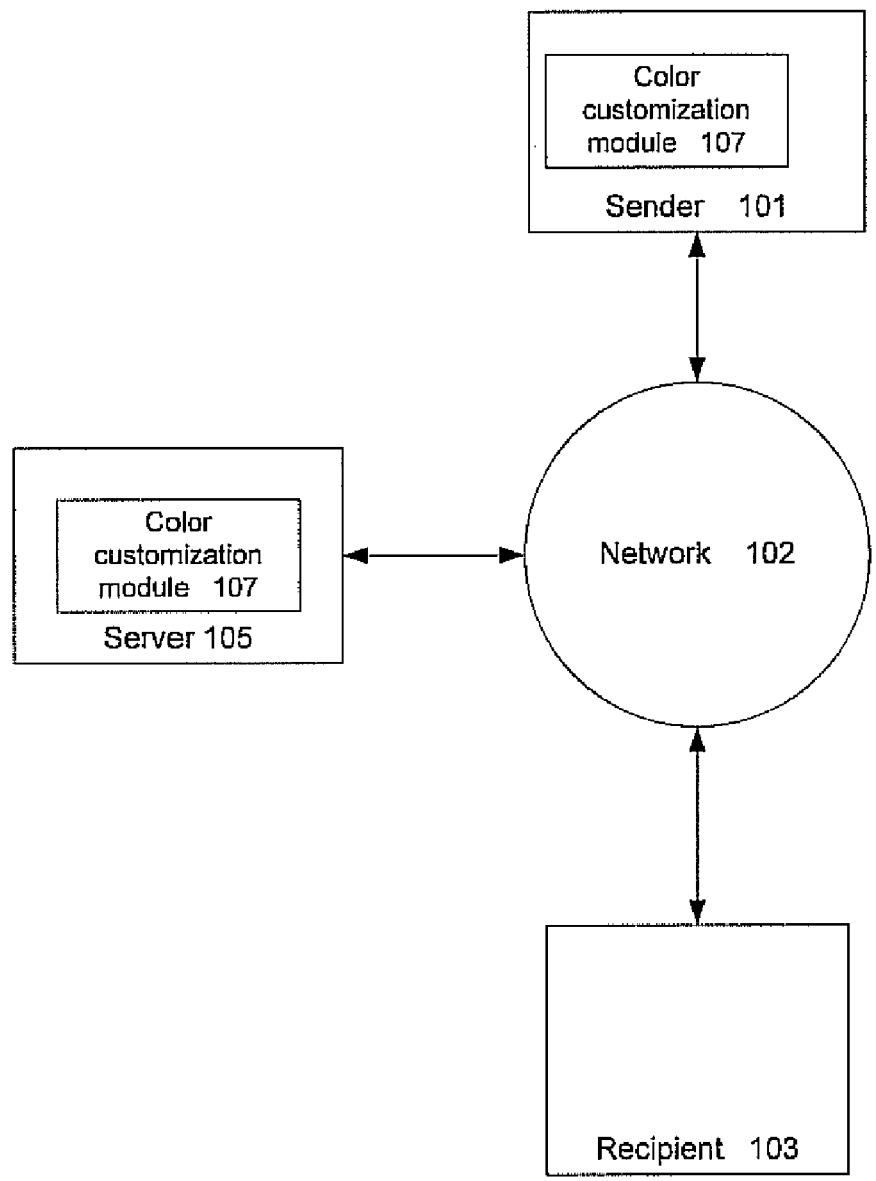
FIG. 1 is a block diagram showing an exemplary client/server environment and network configuration in accordance with the present principles.

FIG. 1 is a block diagram showing an exemplary client/server environment and network configuration in accordance with the present principles. As shown in FIG. 1, at least two data processing systems (e.g., one designated as a sender 101 and another designated as a recipient 103), and optionally, a server 105 are coupled together via a network 102. In one embodiment, the data processing systems 101, 103 and/or server 105 may comprise computers which include a modem and corresponding communication components to connect to the Internet, and/or be connected to the Internet using a cable modem or satellite Internet connectivity. In another embodiment, the data processing systems 101, 103 may be connected in a Local Area Network (LAN). In yet another embodiment, the data processing systems 101, 103 may include means for connecting to the local-area network that itself is connected to the Internet.

A system and method according to the present principles is not limited to a particular type of network system 102 to which the sender 101/recipient 103/server 105 are connected. Exemplary network interfaces include general-purpose systems such as POTS (plain-old telephone systems), ISDN (Integrated Services Digital Network), LAN (local-area network) and WAN (wide-area network). Those skilled in the art will appreciate that the present principles can be applied to virtually any network system without departing from their scope.

Furthermore, the functions of the present principles can be implemented within an email system or can be provided as an add-on component to the email system. A system and method according to the present principles is not limited to any particular email system and one skilled in the art will recognize that the present teachings can be implemented in a variety of email systems.

With regards to the use of certain terms used herein, the following exemplary definitions are provided:

"Client/server": A client is defined as a requester of services and a server is defined as the provider of services. A single machine can comprise both a client and a server depending on the software configuration.

"Domain name": a name that identifies a computer or computers on the Internet. For example, these names may appear as a component of an email address, e.g.,: smith@domainname.com, or a website's URL, e.g., www.domainname.org.

"Network": may comprise any type of network, e.g., LAN (local-area network), WAN (wide-area network), the Internet, etc.

In the exemplary arrangement illustrated in FIG. 1, a color customization module 107 may be provided in at least one of the sender 101 and server 109. Preferably, the color customization module 107 is configured to perform the steps which are, e.g., described below with reference to the exemplary flow charts. The flow charts illustrate embodiments in which the methods comprise computer programs made up of computer-executable instructions. Details of the exemplary components which make up the color customization module are described with reference to FIG. 2.

Figure 2:
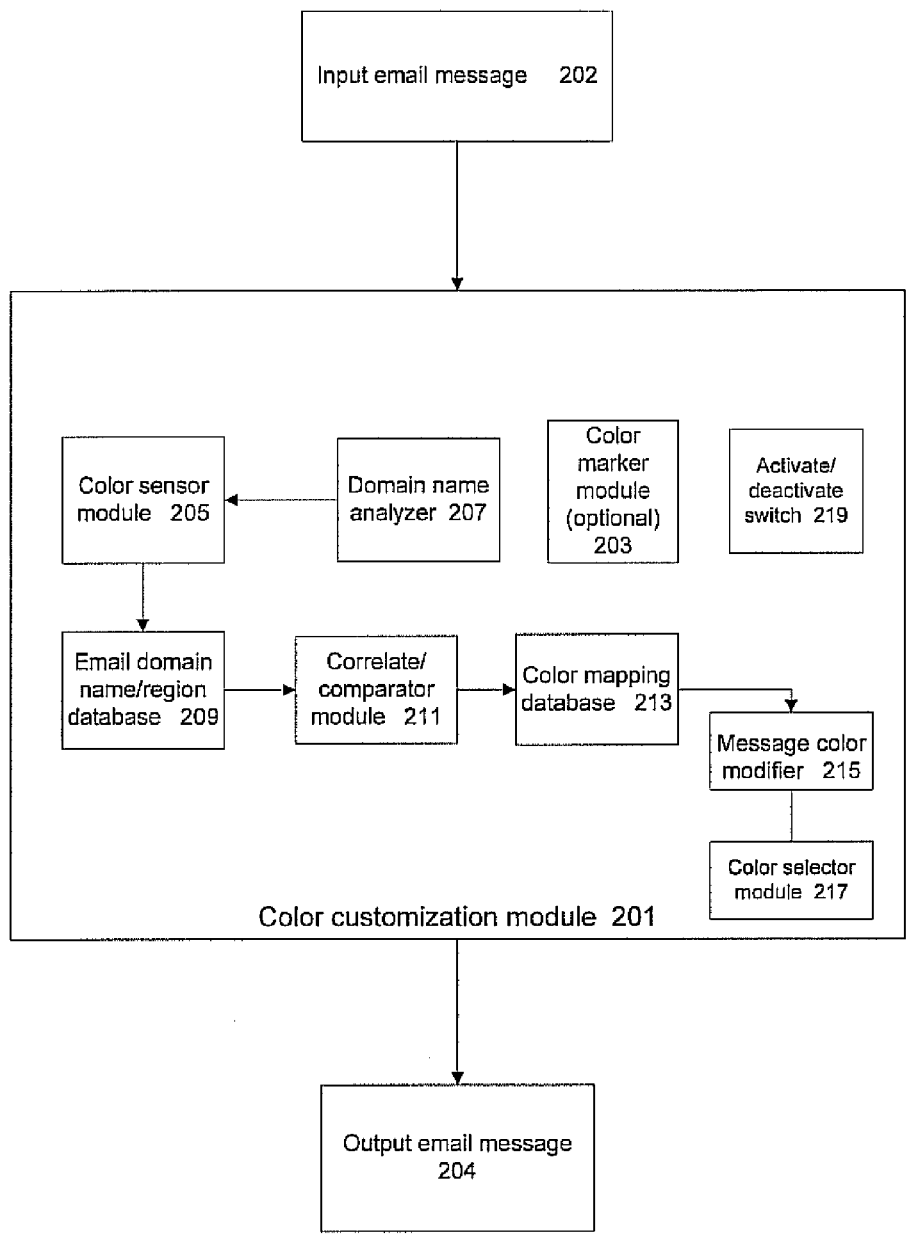
FIG. 2 is an exemplary block diagram of a color customization module and associated elements in accordance with an illustrative embodiment.

FIG. 2 is an exemplary block diagram of a color customization module 201 and associated elements in accordance with an illustrative embodiment. Generally, the color customization module 201 is configured to monitor, evaluate, analyze and modify email messages in accordance with pre-stored parameters, in particular, rules regarding appropriate converted colors to be used in emails messages to be sent to each email recipient. The functions of the various components of the color customization module 201 will be further discussed with respect to FIGS. 3 and 4 below.

An email message may be input 202 to the color customization module 201 for analysis and processing. It is noted that the customization module 201 itself may be embedded or otherwise included at, e.g., the sender 101 and/or server 105. The customization module 201 may include a domain name analyzer 207 for determining the domain name of an email recipient, and a color sensor module 205 for assessing color(s) used in an email message. Optionally, a color marker module 203 may be provided which enables a user to mark areas in an email message which include color to convey a "meta-message", level of information. That is, for example, parts of the email message may use color to add an additional layer of information to the information conveyed in the text of the message itself.

An email domain name/region database 209 comprising domain names and regions in different parts of the world is created, stored and maintained in the customization module 201. The domain name/region database 209 may be updated with new domain names and regions, or existing domain names/regions may be modified as needed to maintain as current, accurate and comprehensive a listing as possible.

Typically, domain names end in a top-level domain (TLD) name, which comprises either one of a small list of generic names (three or more characters), or a two-character territory code based on ISO-3166 (there are exceptions and new codes are integrated case by case) Top-level domains are sometimes also called first-level domains.

With respect to URLs, the following example illustrates the difference between a URL (Uniform Resource Locator) and a domain name:

URL: http://www.example.net/index.html

Domain name: www.example.net

Registered domain name: example.net

A country code top-level domain (ccTLD) is an Internet top-level domain generally used or reserved for a country or a dependent territory. Exemplary ccTLDs include:

.uk (United Kindom)
.eu (European Union)
.cn (People's Republic of China)
.kr (South Korea)

The country corresponding to the domain name in an email address can be deduced in different ways. For commercial business email addresses, e.g., those with a top level domain (TLD) of .com, the country name can be found by parsing the parts of the domain name and looking for a country code. For example, from the address smith(us.company.com, the portion after the "@" sign is the domain name—us.company.com— and the country is the U.S. A person working at a company in India might have the address: mohan@in.company.com.

For Domain names with a country code TLD (ccTLD) specifying the country, the TLD can be used to retrieve the country information. For example, the following email address may go to a person in India: devi@xxx.yyy.in.

Sometimes email addresses might not indicate which region the address is from simply by just analyzing the domain name, e.g.: myemail@hotmail.com or myemail@gmail.com, etc. If the conversion is done at the "server" then there are additional tools available to do the conversion. For example, email addresses may include corresponding user profiles for each which may be searchable to find out which region of the world the address is from.

It is noted that in one exemplary embodiment, if a country or region of an email recipient cannot be determined, color conversion is not performed for that recipient.

A color mapping database 213 may be provided comprised of colors for use with each of the respective domain names/regions stored in the domain name/region database 209, mapped to corresponding colors from other regions which convey a similar meaning. That is, the color mapping database 213 serves as a sort of cross-referencing table, so as to translate a given color from one region into a corresponding color that conveys a similar or more appropriate meaning in another region. For example, an email created in the U.S. in red font to indicate urgency or emphasis might be mapped to a more appropriate color (e.g., blue or black) for sending to Korea, or to a color which might better convey the urgency or emphasis (e.g., a green color).

The color mapping database 213 may be updatable and revised as needed to maintain an accurate and comprehensive listing of approved colors for each domain name and/or region/location of the world.

A correlate/compare module 211 may be provided configured to perform a search function to match a given color used by a sender in an email to an 'approved' (i.e., a more appropriate or correctly translated) color(s) for each recipient based on, e.g., the recipient's email domain name and/or profile information. The correlate/compare module 211 may look up the "translation" of color from the sender's domain name to the recipient's domain name.

Upon comparison between the assessed color of the email and the approved colors for the domain name of the email's intended recipient, any color used in the email is automatically changed as needed to at least one of the approved colors of that domain name. Such dynamic color translation/modification is performed by a message color modifier 215. The modifier 215 may include a color selector module 217 for enabling a user to further customize the color applied, i.e., in situations where more than one approved color exists, by allowing the user to select a desired color from the plurality of approved colors of a domain name.

The domain name database 209, correlate/comparator module 211 and color mapping database 213 may be provided within a single database. Furthermore, the color customization/conversion module 201 may be provided with an on/off feature 219 so that a user may activate or deactivate the color conversion features according to his/her preferences. Other elements not herein described may also be included in the customization module 201.

Figure 3:
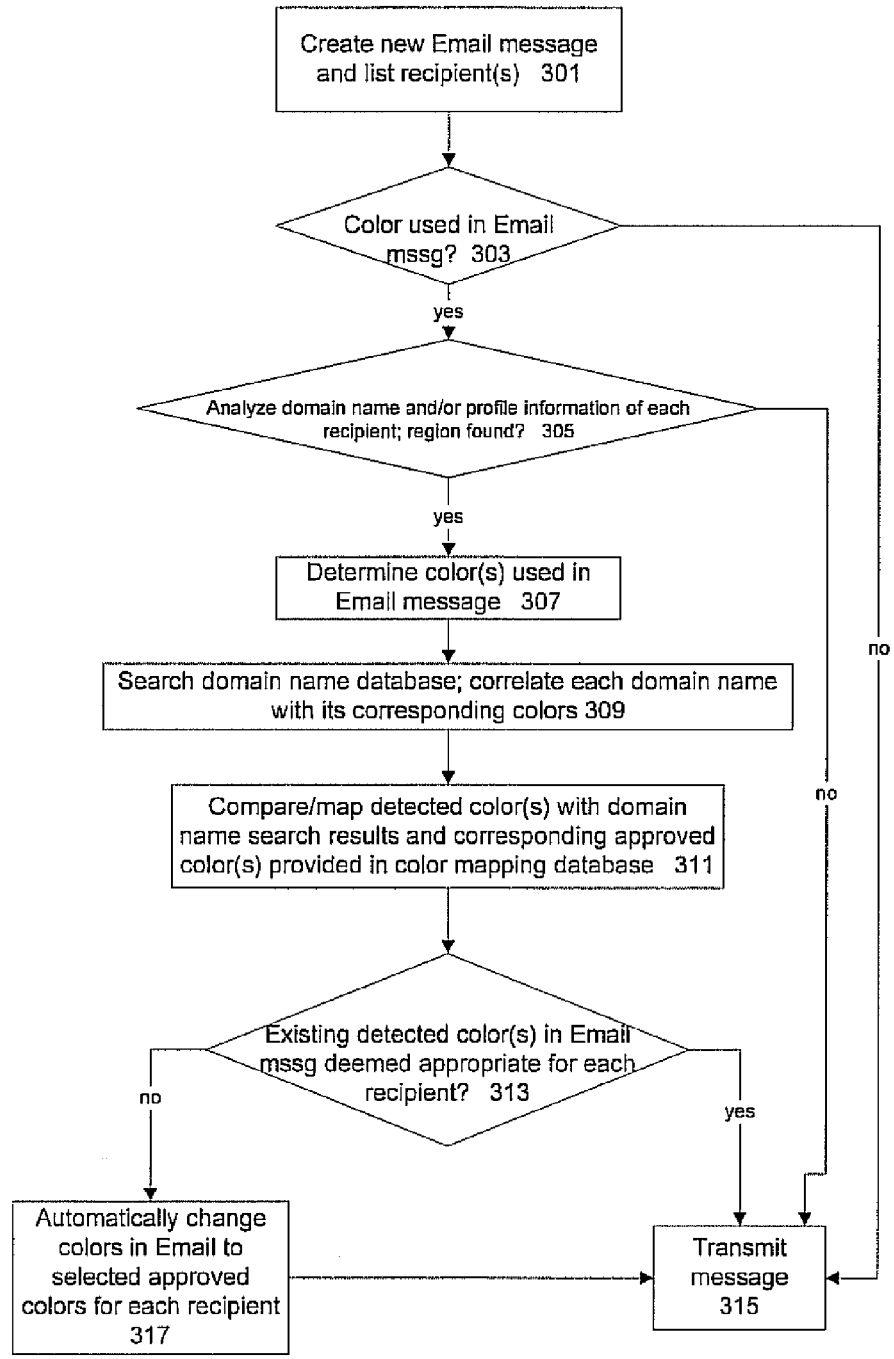
FIG. 3 is a flow chart listing exemplary steps for customizing color in an email message in accordance with an illustrative embodiment.

FIG. 3 is a flow chart listing exemplary steps for customizing color in an email message in accordance with an illustrative embodiment. The exemplary method shown in FIG. 3 is preferably performed at a sender's location (e.g., 101) wherein a user is preparing an outgoing email for sending to a recipient(s). The method of FIG. 3 may also be performed by a server on an outgoing email.

In step 301, a new email message is created and at least one recipient is indicated. -This step may be performed, e.g., by any email system. The functions of this and all other embodiments discussed herein according to the present principles may be implemented within an email system or can be provided as an add-on component to an email system.

In decision step 303, it is ascertained whether any color is being used in the outgoing email message. This step may be performed by, e.g., the color sensor module 205. If the email message does not include color, the message may be automatically transmitted to its recipients, without further processing being necessary (step 315).

If the email message does include color, whether the color is embodied in the color of the text font, text highlighting effects, in the background of the message, in attached images, etc., the email domain name of each recipient is analyzed and parsed out (step 305) to determine a region or location of the recipient. Step 305 may be performed, e.g., by domain name analyzer 207. If the region or location of the recipient cannot be determined from the domain name alone, additional methods and search tools may be employed to determine the region the address is from. For example, profile information for each email address, e.g., user profiles, may be searched to determine the region/location of the world corresponding to the email address. If the region for a recipient cannot be determined, whether by analysis of its domain name or by other means, the method proceeds to step 315 and the message is transmitted to the recipient without color conversion being performed. If a region or location of a recipient is found, the method proceeds to step 307.

In step 307, the actual types of color(s) used in the email message are determined (e.g., this may also be performed by the color sensor module 205).

In step 309, with the determined domain name and/or region of each recipient, a domain name/region database is searched, and each domain name/region is correlated to its corresponding color(s). In step 311, the detected color(s) in the outgoing email is compared with and mapped to correctly translated color(s) based on the search results of the domain name/region database search of step 309 and the approved color(s) for each domain name/region provided in the color mapping database.

In decision block 313 it is determined whether the existing detected colors in the email message are appropriate for each recipient. That is, it is assessed whether the current color(s) used in the email fall within the correctly translated 'approved' colors for the domain name/region of each recipient. In this way, it is assured that the meaning (metamessage) intended to be conveyed by the sender via use of color in an email message is accurately translated via conversion of the color, if necessary, when that email is sent to different recipients in different regions. If the answer to decision block 313 is yes, the email message is transmitted to the recipient(s)

(step 315). Note that steps 309, 311 and 313 may be performed by the correlate/comparator module 211.

If any of the existing color(s) in the email is not within the approved/properly translated colors for each recipient, each 'non-approved' existing color(s) in the outgoing email is automatically changed and converted to one of the approved colors (step 317). Thus, any portion of the email having the non-approved color is automatically and dynamically translated to one or more of the approved colors.

Further, a selection option may be provided in step 317 in which the user may be prompted to select from one or more of the desired colors from a listing of approved colors. Thus, the user may customize the email to include user-selected approved colors. Alternatively, the user (i.e., sender) may enter and store desired pre-approved colors for each domain name and/or recipient that are to be mapped with certain colors used by the sender with which all outgoing emails having color are automatically displayed to certain recipients.

It is noted that steps 309, 311, 313 and 317 are preferably performed for each domain name/region. Advantageously, in situations where an outgoing email includes multiple recipients in various domains/regions, appropriate color changes and translations are therefore made based on the domain name/location of each individual recipient. A single email may be automatically modified to include approved color(s) based on the domain name/location for each recipient.

Figure 4:
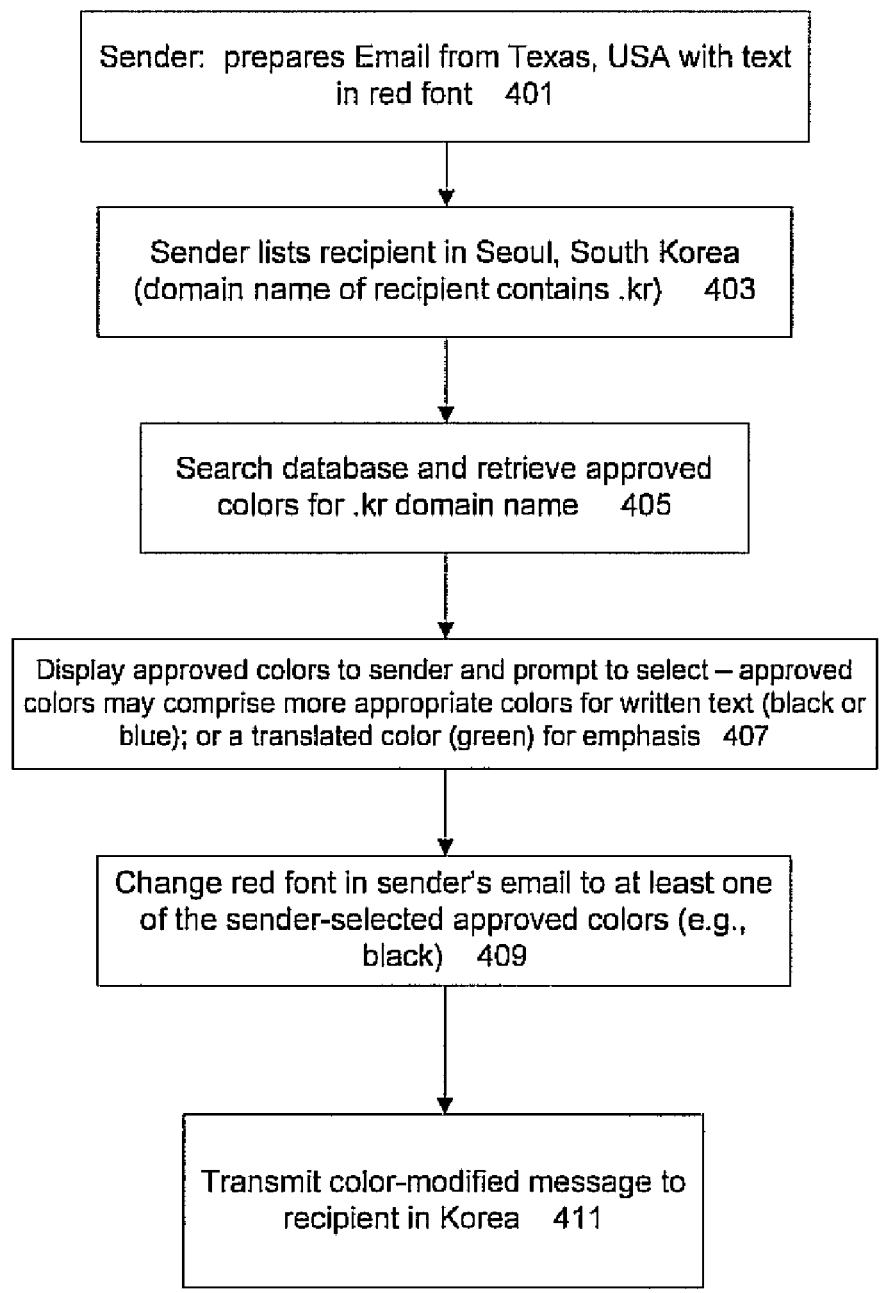
FIG. 4 depicts an illustrative representation of an exemplary method flow of color customization being applied to an email message being sent from the U.S. to Korea in accordance with an illustrative embodiment.

FIG. 4 depicts an illustrative representation of an exemplary method flow of color customization being applied to an outgoing email message by a sender's computer in accordance with an illustrative embodiment. For example, in step 401 a sender in Texas, U.S.A. may prepare an email with text portion of the message in red font. In step 403, the sender lists as one of the email's recipients a recipient located in Seoul, Korea. That is, for example, the domain name of the Korean recipient may include a ".kr" country code.

In step 405, the sender's computer conducts a search of its domain name database and color mapping database and retrieves approved colors for the .kr domain name with respect to colors used in the U.S.A. in this search, it is determined that red is not one of the appropriate colors for use in Korea for written text.

In step 407, the approved colors are displayed to the sender. The sender is prompted to indicate whether to select from a more appropriate color for text in Korea (e.g., blue or black) or to select a color to convey a desired meaning (e.g., urgency or a highlighting effect) which was originally intended by the red font. For example, in Korea the color green may be recommended to be used to convey such a highlighting effect or emphasis in a written message.

In step 409, the red font in the sender's email is automatically changed to at least one of the sender-selected approved colors (e.g., in the case where the sender indicated a black font, all the red font is changed to black). The color-modified email is transmitted to the recipient in Seoul, Korea (step 411).

Accordingly, in summary, systems and methods according to the present principles will help reduce the miscommunication across different cultures due to the usage of different colors that may be culturally charged.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope and spirit of the invention as outlined by the appended claims. Having thus described aspects of the invention, with the details and particularity required by the patent laws, what is claimed and desired protected by Letters Patent is set forth in the appended claims.

What is claimed is:

1. A method for customizing color in an email message based on cultural perspective of each email recipient comprising the steps of:

determining at least one existing color used in an email message;

analyzing at least one of a domain name or user information for each recipient of the email message to determine a region corresponding to each email recipient;

searching a color mapping database to correlate the at least one existing color in the email to at least one approved color corresponding to each region of each email recipient, wherein said at least one approved color conveys a consistent meaning with a meaning of the at least one existing color in the email;

comparing the at least one existing color used in the email message with the at least one approved color for each email recipient, wherein if the at least one existing color does not match any of its corresponding approved colors for each email recipient further comprising the steps of determining a selected approved color to be displayed to each email recipient; and automatically modifying the at least one existing color in the email to at least one of the selected approved colors for each recipient of the email message.

* * * * *